United States Patent [19]
Eddy

[11] 3,905,264
[45] Sept. 16, 1975

[54] SLITTING WHEEL HOLDER

[76] Inventor: Frank M. Eddy, 1294 Roselawn, Thousand Oaks, Calif. 91360

[22] Filed: Aug. 30, 1974

[21] Appl. No.: 501,994

[52] U.S. Cl. .......................... 83/481; 83/8; 83/504; 83/508.2; 83/676; 83/699
[51] Int. Cl.² ............................................ B26D 1/16
[58] Field of Search .......... 83/8, 12, 481, 482, 503, 83/504, 507, 666, 676, 698, 699, 508.2

[56] References Cited
UNITED STATES PATENTS

| | | | |
|---|---|---|---|
| 1,465,966 | 8/1923 | Cameron et al. | 83/482 X |
| 3,266,535 | 8/1966 | Brodie | 83/481 X |
| 3,501,989 | 3/1970 | Lukaczyn, Jr. | 83/481 X |
| 3,651,728 | 3/1972 | Young | 83/482 X |
| 3,831,480 | 8/1974 | Phillips | 83/481 |

*Primary Examiner*—Frank T. Yost
*Attorney, Agent, or Firm*—John E. Kelly

[57] ABSTRACT

A housing with an internal ball bearing assembly is adjustably positionable within a holding block. A sleeve disposed in the housing is formed with a locking ring positioned within the central hole of a slitter wheel. A shaft with an enlarged head is fit concentrically in the sleeve. Tightening the sleeve causes the head to urge the ring into locking engagement against the slitter wheel. The slitter wheel may be quickly dismantled for repair, replacement or substitution without having to replace any component of the slitter wheel holder.

20 Claims, 4 Drawing Figures

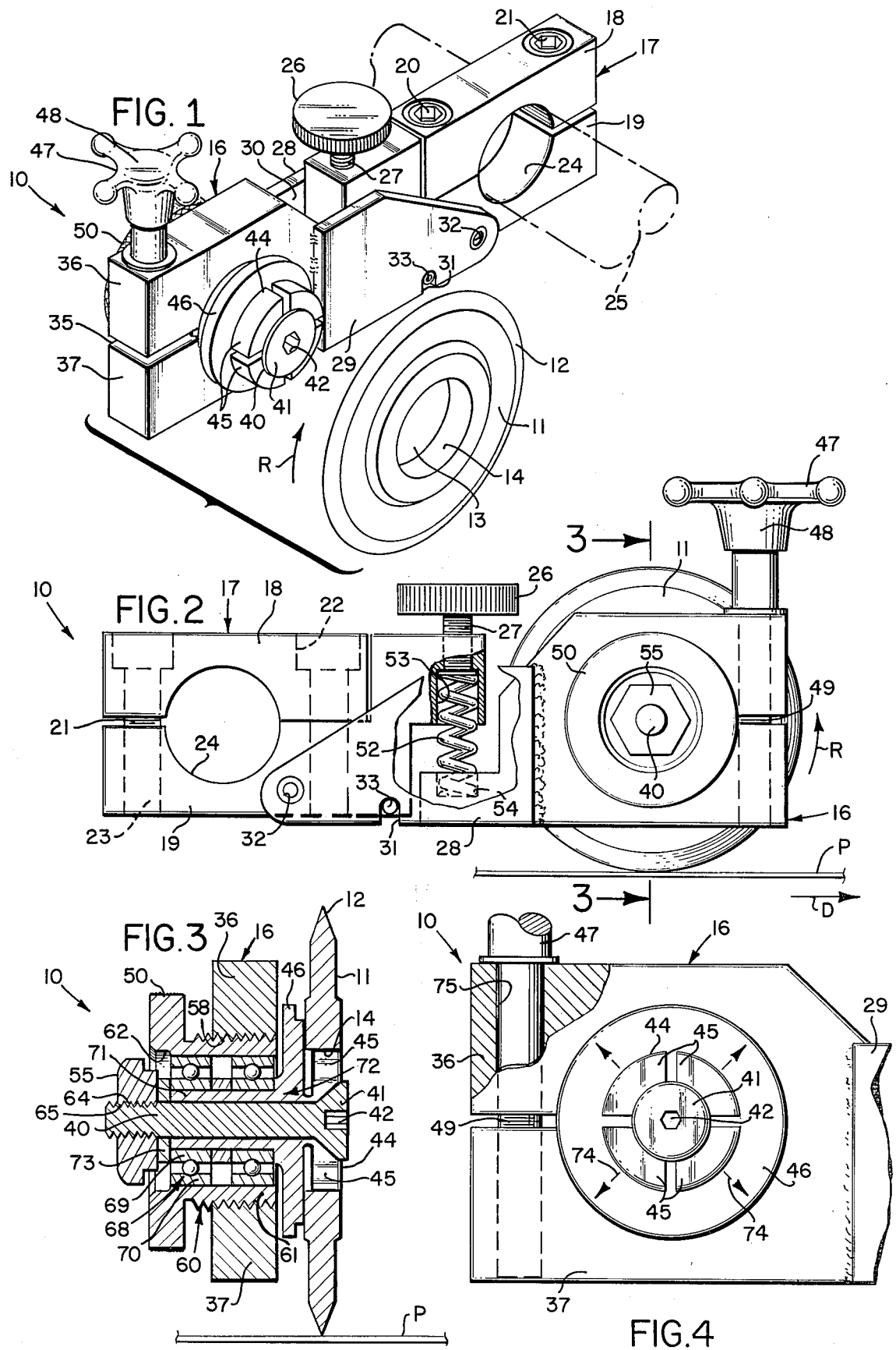

SLITTING WHEEL HOLDER

BACKGROUND OF THE INVENTION

This invention generally relates to cutting devices and more specifically to holding devices for releasably mounting slitter wheels.

Slitting wheels are used to operate on and modify various types of sheet stock, such as paper used in the business forms industry. It may be necessary or desirable to cut, trim, score, perforate, etc., different kinds of business forms in a continuous process.

Slitter wheels are secured directly or indirectly to large slitting and perforating machines which operate to continuously or intermittently feed sheet stock under the slitter wheels. Generally individual ball bearing assemblies are pressed into the hubs or central portions of these conventional slitter wheels so that when and if the slitter wheels become too dull or damaged for further use, their ball bearing assemblies must be disposed of along with the wheels. This is expensive and wasteful.

Slitter wheels are prone to misalignment and their holding mechanisms require frequent and time-consuming adjustments usually within a very limited range of lateral displacement.

SUMMARY OF THE INVENTION

This invention comprehends a slitter wheel capable of being easily installed on and quickly disconnected from a holder which carries internally a ball bearing assembly.

In its broader aspects, the slitter wheel holder includes a holding block formed with a retention opening and a housing positioned in the retention opening. Bearing means such as a ball bearing assembly is carried within the housing and positioned entirely externally of the slitter wheel.

A sleeve engaged with the bearing means is disposed for rotation within the housing. A locking element carried by the sleeve is positioned within a central hole of the slitter wheel. Tightening means is arranged to releasably lock the locking element against the slitter wheel.

The tightening means preferably includes a shaft which extends entirely through the sleeve and serves as an axle for the slitter wheel. Retention means such as a nut is coupled to the shaft and arranged to allow the sleeve and shaft to rotate together. The nut and slitter wheel are positioned on opposite ends of the shaft. An abutment plate is provided to better support the slitter wheel when it is locked in place for operational purposes.

The locking element is a ring or collett split into a plurality of resilient gripping fingers. One end of the shaft is formed with an enlarged head arranged to spread the resilient gripping fingers and thrust them against the slitter wheel.

The opening in the holding block is an internally threaded bore. The housing has an insert portion externally threaded and inter-engaged with the internally threaded bore. A position adjustment means is coupled to the housing for the purpose of laterally repositioning the slitter wheel. The position adjustment means includes a flange connected to the housing by which the housing may be rotated and axially shifted relative to the holding block to thereby cause lateral displacement of the slitter wheel. A detent is provided to selectively prevent relative movement between the housing and holding block and thereby set the position of the slitter wheel.

The holding block is pivotally coupled to a mounting block which has clamping means for clamping it to a fixed object associated with a cutting or perforating machine.

A load adjustment means interconnects the holding block and mounting block and is arranged to regulate the load to be applied by the slitter wheel against sheet stock passing beneath the slitter wheel. The load adjustment means preferably includes a spring loaded adjustment nut coupled to the mouting block and a spring which is interposed and retained between the mounting block and holding block.

BRIEF DESCRIPTION OF THE DRAWINGS

The numerous benefits and unique aspects of the present invention will be fully understood when the following detailed description is studied in conjunction with the drawings in which:

FIG. 1 is a perspective partially exploded view of a slitter wheel holder constructed in accordance with this invention, showing a slitter wheel spaced from the holder and an object in phantom lines to which the holder may be releasably clamped;

FIG. 2 is a side elevational, partially fragmentary view of the holder, showing the slitter wheel in rolling and cutting engagement with underlying sheet stock;

FIG. 3 is a detailed lateral sectional view of holder with components fully assembled for operational use, taken along line 3—3 of FIG. 2; and, FIG. 4 is a side elevational, partially fragmentary, partially sectional view of a front segment of the holder with the slitter wheel removed.

DETAILED DESCRIPTION OF THE PREFERRED EMBODIMENT

Referring now primarily to FIG. 1, a slitter wheel holder 10 is shown for use with a slitter wheel 11 having a cutting edge 12 that may be shaped, textured and otherwise suitable for slitting, scoring, trimming, perforating, etc. Slitter wheel 11 is formed centrally with a hole 13 defined by a smooth annular wall 14 which serves as a locking surface as shall be explained.

The slitter wheel holder has relatively large front and rear sections in the form of a holding block 16 and mounting block 17 respectively. The mounting block 17 is divided into a split segment 18 and a main body 19. The mounting block 17 is equipped with a clamping means embracing a couple of relatively forward and rearward fasteners 20 and 21 which may be tightened in corresponding sockets 22 and 23, best shown in FIG. 2, that extend entirely through the split segment 18 and partially through the main body 19. Split segment 18 and main body 19 are formed with registering socket portions. Semicylindrical wall portions of split segment 18 and main body 19 collectively define a mounting recess 24 extending laterally through the holding block 16. The clamping means can be used to firmly secure the slitter wheel holder to a rod, bar or other object 25 associated with a cutting or perforating machine by tightening the fasteners 20 and 21.

A load adjustment means 26 interconnects holding block 16 and mounting block 17 and includes an adjustment screw 27. Extending rearwardly from holding block 16 are a pair of wing walls 28 and 29 defining an alignment slot 30 which brackets and loosely retains the front end of mounting block 17. The lower edges of wing walls 28 and 29 are formed with locating notches 31. Holding block 16 is hinged or articulated to mounting block 17 by way of the transversely extending pivot pin 32. Downward movement by holding block 16 is limited by a pair of outwardly extending stop pins 33 which project into the locating notches 31.

Holding block 16 is spring loaded to mounting block 17 and the variable cutting force applied by slitter wheel 11 can be regulated or modified by way of the load adjustment means 26.

A horizontally extending slot 35 is formed in holding block 16 dividing it into an upper section 36 and lower section 37 which are slightly resilient and may be forced to partially close the slot 35 as shall be explained.

Extending transversely through the holding block 16 is a shaft 40 having an enlarged head 41 with an hexagonal socket 42. Disposed adjacent to and positioned inwardly of enlarged head 41 is a ring or collett 44 that is radially split to constitute a number of resilient gripping fingers 45. Between holding block 16 and ring 44 is an abutment plate 46 against which slitter wheel 11 may be thrust for support and alignment purposes.

A detent 47 is coupled to holding block 16 and may be used to urge upper section 36 and lower section 37 together. Detent 47 includes a large knob for manual control and a bolt 49 coupled to the knob and extending through registering bolt opening segments formed in upper section 36 and lower section 37.

A position adjustment means 50 in the form of a knurled flange 50 is provided to laterally adjust slitter wheel 11 to align it with a predetermined cutting line or path.

Referring now primarily to FIG. 2, the adjustment screw 27 resiliently engages a captivated coil spring 52 which is interposed and retained between mounting block 17 and holding block 16 by way of vertically aligned upper spring chamber 53 and lower spring chamber 54 respectively. A retention means in the form of a nut 55 is connected to an end of shaft 40.

The slitter wheel 11 rotates in a direction indicated by arrow R as the sheet stock or paper P is fed by a machine in a direction indicated by directional arrow D. The paper P may be fabricated into business forms, envelopes, invoices, etc.

Referring now to FIG. 3, the holding block 16 is formed with a transversely extending retention opening 58 that is internally threaded. A housing 60 is movably coupled to holding block 16 and has a threaded portion 61 interengaged with the holding block threads defined by the retention opening 58. One end of housing 60 constitutes the knurled flange 50 which may be used as a position adjustment means. A cavity 62 defined by housing 60 accommodates retention nut 55.

Carried internally of housing 60 is a ball bearing assembly 68 having an inner annular ball race 69 and an outer annular ball race 70.

An elongated sleeve 72 extends into housing 60 and is disposed between ball bearing assembly 68 and shaft 40 which acts as an axle for slitter wheel 11. One end of sleeve 72 defines the locking ring 44, an intermediate portion defines the abutment plate 46 and the opposite sleeve end 71 is adjacent a bushing 73 held on shaft 40 by retention nut 55. The enlarged head 41 of shaft 40 is conically shaped so that when tightened by retention nut 55 it will cause the gripping fingers 45 of internally tapered locking ring 44 to spread outwardly into locking engagement against the smooth annular wall 14 of slitter wheel 11.

Referring to FIG. 4 the enlarged head 41 is shown in tight fitting engagement against the gripping fingers 45 causing them to spread radially outwardly as indicated by stress arrows 74. The detent 47 is shown coupled in a bolt opening 75 for accommodating the bolt 49. When the position adjustment means 50 has been rotated sufficiently to accurately align slitter wheel 11, then the detent 47 may be torqued to set slitter wheel 11 in place by preventing further axial movement of housing 60 and all components within housing 60. The upper and lower holding block sections 36 and 37 are caused to flex and compress inwardly to prevent undesired motion until the detent 47 is used to free housing 60 for rotational travel produced by manipulating the position adjustment means 50.

OPERATION

Keeping the above construction mind, it can be understood how many of the previously described disadvantages of conventional slitter wheel holding techniques are overcome or substantially eliminated by this invention.

The slitter wheel holder 10 is satisfactorily clamped to a support bar or rod 25 of a conventional perforating or cutting machine by way of tightening the fasteners 20 and 21.

The cutting force or load to be exerted by slitter wheel 11 is set by regulating the load adjustment means 26. With the detent 47 loosened or relaxed, the position adjustment means 50 is manipulated until slitter wheel 11 is urged into proper alignment with a predetermined cutting path in order to slit, trim, perforate, etc., the underlying paper P. Detent 47 can be tightened to temporarily fix the position of slitter wheel 11 and loosened so that the slitter wheel 11 may be repositioned for different cutting operations.

The slitter wheel 11 and housing 60 along with all components within housing 60 may be quickly dismantled and reassembled in a reverse orientation from the opposite side of holding block 16. Slitter wheel 11 may be quickly uncoupled from locking ring 44 for repair, replacement, sharpening, etc. Moreover, slitter wheel 11 may be easily interchanged with other slitter wheels with differently shaped cutting edges.

To dismantle the components, the detent 47 is loosened and the retention nut 55 is removed so shaft 40 may be withdrawn from housing 60 along with sleeve 72. Relieved of all locking stress, the slitter wheel 11 may be slipped from the resilient gripping fingers 45. Housing 60 can then be rotated entirely out of the threaded bore 58 of the holding block 16.

If so dictated by cutting alignment needs, all of these components may selectively be installed from the opposite side of the holding block 16.

From the foregoing it will be evident that the present invention has provided a slitter wheel holder in which all of the various advantages are fully realized.

What is claimed is:

1. A holder for a slitter wheel having a central hole, comprising:
   a. a holding block formed with a retention opening;
   b. a housing positioned in the retention opening of the holding block;

c. bearing means carried within the housing;

d. a sleeve engaged with the bearing means and disposed for rotation within the housing;

e. a locking element on the sleeve and capable of being positioned in the central hole of the slitter wheel; and, f. tightening means for releasably locking the locking element against the slitter wheel.

2. The structure according to claim 1 wherein the tightening means includes:
a shaft which extends entirely through the sleeve and serves as an axle for the slitter wheel.

3. The structure according to claim 2 wherein the tightening means includes:
retention means coupled to the shaft and arranged to allow the sleeve and shaft to rotate together.

4. The structure according to claim 3 including:
a slitter wheel; and,
an abutment plate on the sleeve between the housing and slitter wheel, the slitter wheel and abutment plate being held in abutting engagement by the shaft and retention means.

5. The structure according to claim 4 wherein:
the retention means is a nut; and,
the nut and slitter wheel are positioned on opposite ends of the shaft.

6. The structure according to claim 1 wherein:
the locking element is a ring;
the tightening means includes a shaft which extends into the sleeve and is formed with an enlarged head disposed within the ring, the head being arranged to urge the ring into locking engagement against the slitter wheel.

7. The structure according to claim 6 wherein:
the ring is split into resilient gripping fingers.

8. The structure according to claim 7 wherein:
the internal periphery of the ring is conically shaped; and,
the sleeve enlarged head is tapered to assist in spreading the resilient gripping fingers and thrusting them against the slitter wheel.

9. The structure according to claim 1, wherein:
the retention opening of the holding block is an internally threaded bore;
the housing has an insert portion externally threaded and inter-engaged with the internally threaded bore.

10. The structure according to claim 9, including:
position adjustment means coupled to the housing for laterally repositioning the slitter wheel.

11. The structure according to claim 10 wherein:
the position adjustment means includes a flange connected to the housing by which the housing may be rotated and axially shifted relative to the holding block.

12. The structure according to claim 1 wherein:
a detent is provided for preventing relative movement between the housing and holding block; and,
the bearing means is a ball bearing assembly.

13. The structure according to claim 1 including:
a mounting block pivotally coupled to the holding block.

14. The structure according to claim 13 including:
clamping means for clamping the mounting block to an object.

15. The structure according to claim 14 wherein:
the mounting block is formed with a mounting recess, a split segment, and, sockets extending through the split segment and into the main body of the mounting block; and,
the clamping means has a pair of fasteners disposed in the sockets that may be tightened to clamp the mounting block on an object disposed in the mounting recess.

16. The structure according to claim 13 including:
load adjustment means interconnecting the holding block and mounting block and being arranged to regulate the load applied by the slitter wheel.

17. The structure according to claim 16 wherein the load adjustment means includes:
a spring load adjustment screw coupled to the mounting block; and,
a spring interposed and retained between the mounting block and holding block.

18. A slitter wheel and holder, comprising:
a. a slitter wheel formed centrally with a locking hole;
b. a holding block formed with a laterally extending and internally threaded bore;
c. a housing rotatably coupled in the internally threaded bore of the holding block;
d. a flange carried by the housing for rotating the housing relative to the holding block to thereby laterally reposition and align the slitter wheel.
e. a ball bearing assembly carried fully within the housing and positioned entirely outside of the slitter wheel;
f. a sleeve engaged with the ball bearing assembly and disposed for rotation within the housing;
g. a locking ring formed by one end of the sleeve and positioned in the locking hole of the slitter wheel;
h. a shaft extending entirely through the sleeve to serve as an axle for the slitter wheel, the shaft having an enlarged head disposed within the locking ring and arranged to urge the ring into locking engagement against the slitter wheel; and,
i. retention means coupled to the shaft and arranged to allow the sleeve and shaft to rotate together.

19. The structure according to claim 18 wherein:
the locking ring is split into a plurality of resilient gripping fingers and has an internal periphery that is conically shaped; and,
the sleeve enlarged head is tapered to assist in spreading the resilient gripping fingers and thrusting them against the slitter wheel.

20. The structure according to claim 19 including:
a mounting block pivotally coupled to the holding block;
clamping means for clamping the mounting block to an object; and,
load adjustment means interconnecting the holding block and mounting block and being arranged to regulate the load applied by the slitter wheel.

* * * * *